J. F. FAIR.
ATTACHMENT FOR AUTOMOBILES.
APPLICATION FILED SEPT. 21, 1920.

1,388,996.

Patented Aug. 30, 1921.

James F. Fair, Inventor
By Frank S. Anderman
Attorney

UNITED STATES PATENT OFFICE.

JAMES F. FAIR, OF DOBY SPRINGS, OKLAHOMA.

ATTACHMENT FOR AUTOMOBILES.

1,388,996.      Specification of Letters Patent.      Patented Aug. 30, 1921.

Application filed September 21, 1920. Serial No. 411,694.

*To all whom it may concern:*

Be it known that I, JAMES F. FAIR, a citizen of the United States of America, and resident of Doby Springs, in the county of Harper and State of Oklahoma, have invented certain new and useful Improvements in Attachments for Automobiles, of which the following is a specification.

This invention relates to attachments for automobiles and particularly to means for augmenting the supporting action of springs of automobiles of the Ford type both in the passenger and truck automobile construction, the said invention having for its object the provision of novel means for reinforcing the front spring of an automobile of the type indicated or other automobiles having springs of like character; the said invention having for its object the provision of novel means whereby an auxiliary spring may be mounted in operative relation to the spring and axle whereby the auxiliary spring is brought into play or action when the regular spring has been deflected or moved to a predetermined degree, the said auxiliary spring then aiding in supporting the load and relieving the main spring.

A still further object of this invention is to produce an auxiliary spring associated with novel means for loosely mounting the auxiliary spring on the main spring and in operative relation to the axle whereby guiding means are employed to prevent undue movement of the auxiliary spring with relation to the axle.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
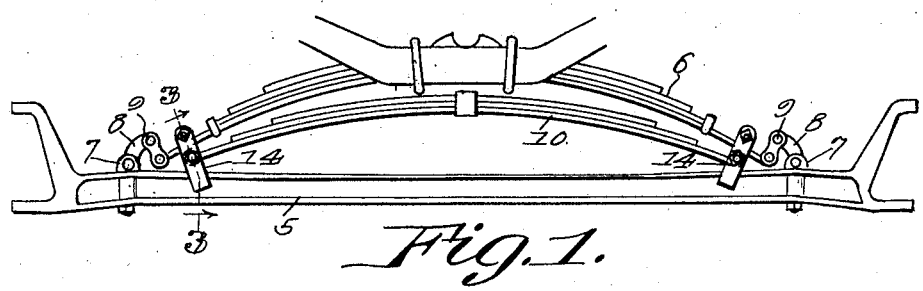
Figure 1 illustrates a view in elevation of the main spring and auxiliary spring and parts associated therewith.
Figure 2:
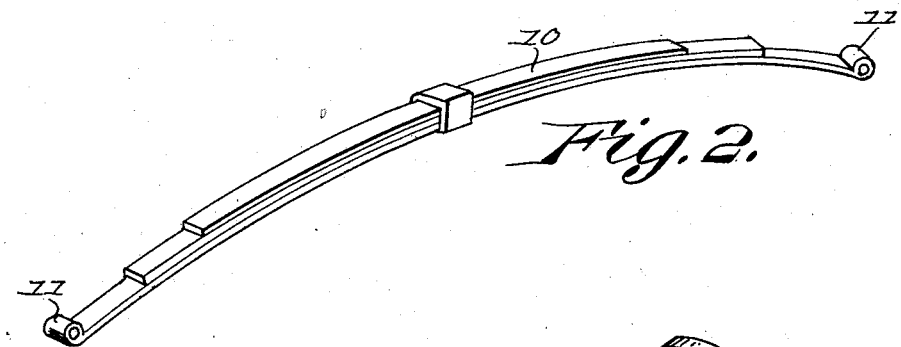
Fig. 2 illustrates a perspective view of the auxiliary spring.
Figure 3:
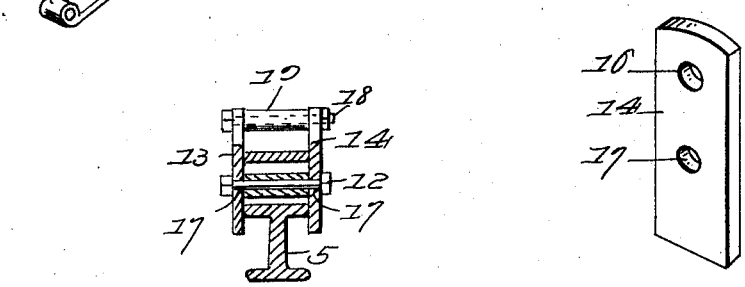
Fig. 3 illustrates a sectional view on the line 3—3 of Fig. 1.
Figure 4:
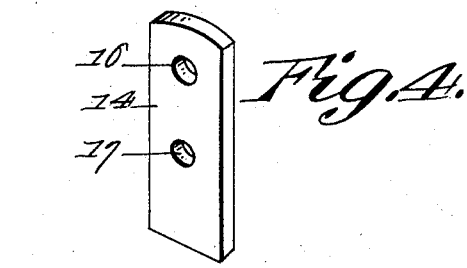
Fig. 4 illustrates a perspective view of one of the plates associated with the auxiliary spring.

In these drawings 5 denotes an axle of conventional type, 6 a main spring, 7, 8 and 9 elements of known construction by which the main spring at its ends is connected to the axle. As all of these parts are familiar to those skilled in the art, they will not be described in detail.

The auxiliary spring 10 may be of any appropriate strength, that is to say, it may consist of as many leaves as practice dictates is necessary, and of course, the thickness of the leaves or their dimensions will be left to the discretion of the maker or user. These considerations depend upon the work to be performed, the load to be carried and the like and need not be specified as requisites of the invention.

It is enough as a disclosure of the invention and the best method known to the inventor for carrying it into practice to say that the spring 10 has eyes 11 in its ends which are intended to receive bolts such as 12 by which the ends of the springs are connected to plates 13 and 14 at each end, each of the plates having apertures such as 16 and 17, the latter of which also receives the bolts 12 by which the spring 10 is connected to the plates. The apertures 17 are practically or approximately half way between the ends of the plates, and the sides of the plates below the apertures 17 extend across or partially across the sides of the axle and constitute guides by which the auxiliary spring is held immediately over the axle. The upper apertures 16 are intended to receive the bolts 18 and these bolts 18 preferably are supplied with anti-friction collars or rollers 19 which overlie the main spring 6 near its outer ends and engage such main spring to maintain the auxiliary spring in operative relation to the main spring.

It is shown in the drawing that the main spring near its outer ends extends between the bolts 12 and 18, and these bolts in connection with the plates which are arranged in pairs, one on each side of the main spring at each end, maintain the parts in assembled relation to one another, so that the auxiliary spring may act in accordance with the objects of the invention when the main spring has become abnormally loaded.

I claim:

1. In an automobile spring support, the combination with a main spring, an axle to which the main spring is operatively connected, an auxiliary spring having eyes in its ends, plates on opposite sides of the spring at the said ends, bolts extending through the plates and through the eyes of the auxiliary spring, the said plates extending downwardly on opposite sides of the axle, and means for holding the plates in assembled relation to the main spring.

2. In an automobile spring support, the combination with a main spring, an axle to which the main spring is operatively connected, an auxiliary spring having eyes in its ends, plates on opposite sides of the spring at the said ends, bolts extending through the plates and through the eyes of the auxiliary spring, the said plates extending downwardly on opposite sides of the axle, the said plates having apertures near their upper ends and bolts extending through the apertures of each pair of plates above the main spring whereby the main spring is held between said bolts and said auxiliary spring.

3. In an automobile spring support, the combination with an axle, a spring and means for maintaining the spring in assembled relation to the axle, an auxiliary spring between the main spring and the axle, plates at the ends of the auxiliary spring and at the sides thereof, means for connecting the plates to the auxiliary spring at points between the ends of the said plates, the said plates extending on opposite sides of the axle whereby the auxiliary spring is guided with respect to the axle, members connecting the plates of each pair above the main spring whereby the said main spring is operatively held between said plates.

JAMES F. FAIR.